United States Patent [19]

Linning et al.

[11] 4,038,138

[45] July 26, 1977

[54] NUCLEAR REACTOR FUEL ELEMENTS

[75] Inventors: David Lees Linning; John Alan Dodd, both of Warrington, England

[73] Assignee: United Kingdom Atomic Energy Authority, London, England

[21] Appl. No.: 551,078

[22] Filed: Feb. 20, 1975

[30] Foreign Application Priority Data

Mar. 7, 1974 United Kingdom ............... 10243/74

[51] Int. Cl.² .............................................. G21C 3/12
[52] U.S. Cl. ......................................... 176/81; 176/78
[58] Field of Search .............................. 176/81, 78, 40

[56] References Cited

U.S. PATENT DOCUMENTS

| 3,274,069 | 9/1966 | Alfille ................................. 176/81 |
| 3,798,125 | 3/1974 | Skok ................................... 176/81 |

FOREIGN PATENT DOCUMENTS

| 2,061,146 | 9/1971 | Germany ............................. 176/81 |
| 844,167 | 8/1960 | United Kingdom ................. 176/81 |
| 1,226,826 | 3/1971 | United Kingdom ................. 176/78 |

*Primary Examiner*—Harvey E. Behrend
*Attorney, Agent, or Firm*—Larson, Taylor and Hinds

[57] ABSTRACT

A nuclear reactor fuel element having wire wrap spacing means of a form which contacts the fuel element at a series of regularly spaced intermittent points so that coolant can flow between the wire wrap and the fuel element and between the points of contact. The wire wraps may be of single wire coiled coil form or twin interwound wires.

2 Claims, 2 Drawing Figures

NUCLEAR REACTOR FUEL ELEMENTS

BACKGROUND OF THE INVENTION

This invention relates to nuclear reactor fuel elements.

The fuel elements of a nuclear reactor core may be arranged in discrete groups, each group being included in a replaceable construction termed a sub-assembly. One such sub-assembly which is used in a fast reactor cooled by liquid sodium comprises a hexagonal bundle of 127 slender fuel elements enclosed by a steel wrapper about the periphery of the bundle. The fuel elements are each helically wrapped with wire spacers which inhibit bowing and vibration and ensure efficient cooling. However, it is expected that in operation of the nuclear reactor the temperature of the fuel element sheath underneath the wire wraps will be higher than the remaining regions of the sheath due to the presence of stagnant coolant and to accommodate such a temperature differential the maximum operating temperature of the fuel element would be severely limited.

SUMMARY OF THE INVENTION

According to the invention, a nuclear reactor fuel element has wire wrap spacing means of a form which contacts the fuel element at a series of regularly spaced intermittent points so that coolant can flow between the wire wrap and the fuel element and between the points of contact.

DESCRIPTION OF THE DRAWINGS

Constructions of nuclear reactor fuel elements incorporating the invention are now described, by way of example, with reference to the accompanying drawings wherein.

DESCRIPTION OF THE PREFERRED EMBODIMENTS

Figure 1:
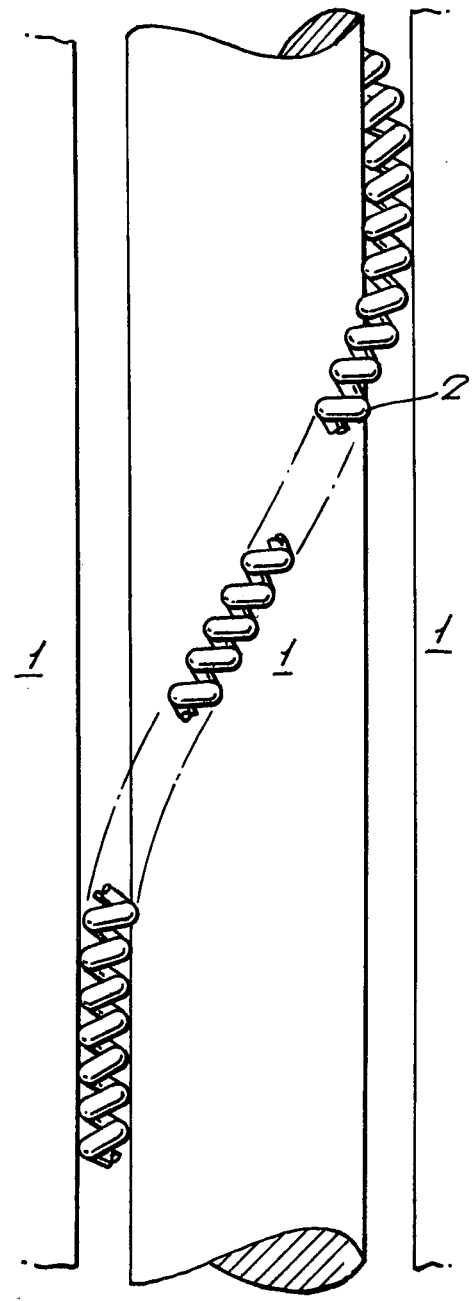
FIG. 1 is fragmentary side view of one fuel element, drawn to an enlarged scale.

The fuel element 1 shown in FIG. 1 comprises uranium carbide enclosed within a stainless steel sheath. The fuel element has a wire wrap 2 which serves to space the fuel element from adjacent fuel elements 1 in a bundle of fuel elements enclosed by a peripheral wrapper (not shown). The wire wrap 2 comprises a single wire helically wound about its longitudinal axis in the manner of an open coil helical spring. The helically wound wire is wound in a helical path about the fuel element so that it makes contact along a helical path in a series of regularly spaced intermittent contacts. The diameter of the wire is approximately 50 percent of the coil diameter. A wire wrap of this form enables coolant to flow between the wire wrap and the fuel element between the points of contact. Such a wrap also has sufficient transverse stiffness to maintain constant the spacing of fuel elements in the bundle under normal operation. The outside diameter of the fuel element is 9.14 mm, the outside diameter of the coils of wire is 2.5 mm and the diameter of the wire 1 mm.

Figure 2:
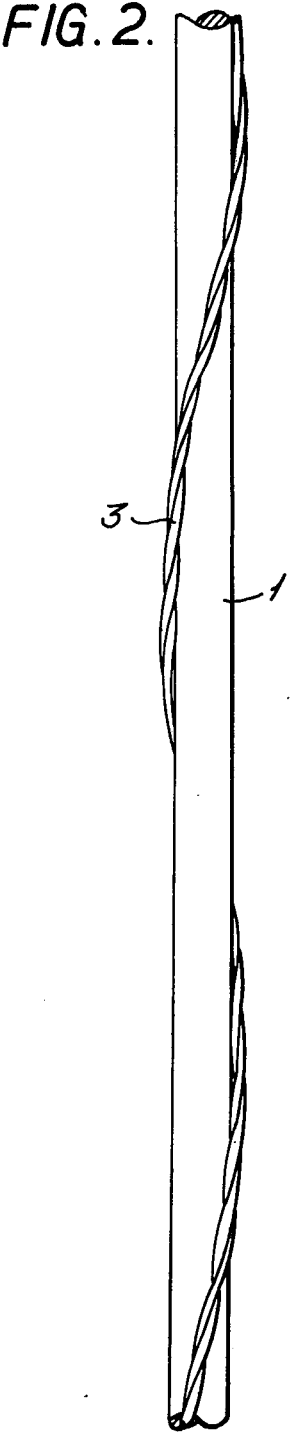
FIG. 2 is a fragmentary side view of a second fuel element.

In the construction of fuel element 1 shown in FIG. 2, a wire wrap 3 comprises two wires of equal diameter interwound in the manner of twin lead flex used for electric lighting installations. The combination of interwound wires is wound helically about the fuel element to contact it in a series of regularly spaced intermittent contacts. The twin wire wrap is wound in a clockwise direction about the fuel element and the wires are wound clockwise about each other. Alternatively, the twin wire wrap may be wound in an anticlockwise direction about the fuel element and the wires wound anticlockwise about each other. By winding the wires about each other and the wound combination about the fuel element in the same direction, nesting of fuel elements one with another in the bundle is improved and the spacing of fuel elements is more uniform.

In a third construction of fuel element which is generally similar to the combination shown in FIG. 2 the wire wrap comprises a relatively large diameter single wire having a smaller diameter wire helically wound about it. The combination of wire is wound helically about the fuel element so that the coils of the small wire make contact with the fuel element along a helical path in a series of regularly spaced intermittent contacts. Wires having diameters in the ratio 2:1 are suitable, for example, in a wire wrap for effecting 0.1 inch spacing between fuel elements the larger wire is approximately 0.050 inch diameter whilst the smaller wire is approximately 0.025 inch diameter.

We claim

1. In a liquid metal cooled fast reactor, a sub-assembly comprising a bundle of spaced fuel elements surrounded by a wrapper, said fuel elements each comprising an elongate cylindrical sheath at least a portion of which is of constant diameter cross section and containing nuclear fuel and having at least one spacing member for spacing the fuel element from neighboring elements in a bundle, said spacing member comprising a wire member helically wrapped around the sheath in the form of a helix over said portion of said fuel element sheath of constant diameter, the improvement wherein all of said wire members are identical and each of said wire members comprises a wire of constant diameter wound about its longitudinal axis in the manner of an open coil spring and wrapped around said fuel element as said helix such that said wire member contacts the fuel element at a series of regularly spaced intermittent points such that, in use, coolant can flow between said wire member and the fuel element and between the points of contact.

2. In a liquid metal cooled fast reactor, a sub-assembly comprising a bundle of spaced fuel elements surrounded by a wrapper, said fuel elements each comprising an elongate cylindrical sheath at least a portion of which is a constant diameter cross section and containing nuclear fuel and having at least one spacing member for spacing the fuel element from neighboring elements in a bundle, said spacing member comprising a wire member helically wrapped around the sheath in the form of a helix over said portions of said fuel element sheath of constant diameter, the improvement wherein all of said wire members are identical and each of said wire members comprises two wires of constant and equal diameter interwound with each other and wrapped around said fuel element as said helix such that said wire member contacts the fuel element at a series of regularly spaced intermittent points such that, in use, coolant can flow between said wire member and the fuel element and between the points of contact.

* * * * *